Patented Jan. 10, 1939

2,143,371

UNITED STATES PATENT OFFICE 2,143,371

PRODUCTION OF OLEFINE OXIDES AND OF CATALYSTS FOR USE IN SUCH PRODUCTION

Jacques Françon, Courbevoie, France, assignor, by mesne assignments, to Carbide and Carbon Chemicals Corporation, New York, N. Y., a corporation of New York No Drawing. Application September 4, 1935, Serial No. 39,196. In Great Britain September 13, 1934

10 Claims. (Cl. 260—348)

This invention relates to the production of olefine oxides and of catalysts for use in such production. Hitherto one of the chief drawbacks to the commercial production of ethylene oxide from ethylene by oxidation has been the simultaneous production of aldehydes and the difficulty of separation.

It has, however, been proposed to effect the conversion by the aid of certain catalysts and the chief object of the present invention is to improve the process of production by providing a catalytic material of new or improved form.

According to the present invention the catalytic material consists of silver or gold or both in the elemental state or alloyed with small amounts of another metal such as copper or iron and is in the form of small laminar fragments or flakes. This physical condition of the material may be attained by reducing a quantity of the metal or alloy to the state of very thin sheets or foil and by then breaking the latter into small fragments. One satisfactory way of breaking up the laminar or thin sheet material into fragments is to disintegrate or shatter it mechanically in a non-solid medium, preferably a somewhat heavy or viscous liquid such as a strong solution of an organic colloid for example gum arabic, pectin, gelatine or the like. Any suitable shattering or fragmentizing means may be used for the purpose. The catalyst is then separated from the medium by washing and is dried at a low temperature.

If into contact with catalytic material constituted as above described and heated to from about 150° C. to 400° C. ethylene or propylene and oxygen or oxygen-containing gases are brought, preferably with the addition of water vapor or carbon dioxide or hydrogen or any or all of these, the respective olefine oxide is produced without any appreciable production of undesirable by-products. This operation can be carried out either at atmospheric pressure or at pressures below or above atmospheric.

The following is one example of the way in which the catalyst according to the invention may be prepared:—

A bar of silver containing 0.33 per cent. of gold and 0.18 per cent. of copper is hammered and transformed into leaves having a thickness of between 0.005 mm. to 0.009 mm. These leaves are then torn into fragments by stirring arms in an aqueous solution of gum arabic containing fifty per cent. of water by adding them one by one until the mass acquires the consistency of a thick paste. About 100 grams of the leaves may be added to about 1 kilogram of the gum arabic. The paste is then washed by decantation in a large quantity of water and the washing is finished on a filter. The washed material is finally dried at a low temperature, e. g., 50° C., and the dried scaly mass is then sifted through a screen of 120 mesh. The sifted powdery product is then ready for use.

As the catalytic material of the present invention is so constituted and in such a physical state as to be susceptible to the action of poisons, the process of production should be conducted at all stages in the absence of any compound of sulphur, phosphorus, arsenic and similar poisons.

What I claim is:—

1. The method of producing olefine oxides by catalytic oxidation which comprises subjecting the respective olefine in an oxidizing atmosphere to the action of heat at a temperature ranging from 150° C. to 400° C. in the presence of catalytic material in the form of small laminar fragments of shattered thin gold foil.

2. The method of producing olefine oxides by catalytic oxidation which comprises subjecting the respective olefine in an oxidizing atmosphere to the action of heat at a temperature ranging from 150° C. to 400° C. in the presence of catalytic material in the form of small laminar fragments of shattered thin gold foil containing a small amount of alloyed metal taken from the group consisting of copper and iron.

3. A process for producing olefine oxides by catalytic oxidation which comprises subjecting the respective olefine to the simultaneous action of oxygen and water in the presence of a catalyst comprising small laminar flakes of silver alloyed with small quantities of a metal selected from a group consisting of gold, copper and iron, at a temperature between 150° C. and 400° C.

4. A process for the production of ethylene oxide comprising subjecting ethylene to the simultaneous action of oxygen and water in the presence of a catalyst comprising small laminar flakes of silver alloyed with small quantities of a metal selected from a group consisting of gold, copper and iron, at a temperature between 150° C. and 400° C.

5. Catalyst for the production of olefine oxides by the oxidation of olefines with oxygen-containing gas, which catalyst is essentially composed of finely divided metal of the group consisting of silver, gold and alloys predominating in at least one of these, said metal having been reduced to thin sheets of a thickness between about 0.005 mm. to about 0.009 mm., and still further reduced mechanically to finely divided fragments capable of passing a screen of 120 mesh.

6. Catalyst for the production of ethylene oxide by the direct oxidation of ethylene at temperatures of about 150° to about 400° C. with oxygen-containing gas, which catalyst is essentially composed of finely divided silver metal which has been reduced to thin sheets of a thickness between about 0.005 mm. to about 0.009 mm., and still further reduced mechanically to finely divided fragments capable of passing a screen of 120 mesh.

7. Process for making catalysts essentially composed of finely divided metal of the group consisting of silver, gold and alloys predominating in at least one of these for the production of olefine oxides by the oxidation of olefines with on oxygen-containing gas, which includes the steps of reducing said metal to thin foil of a thickness between about 0.005 mm to about 0.009 mm., and still further reducing said thin foil mechanically to finely divided fragments capable of passing a screen of 120 mesh.

8. Process for making catalysts essentially composed of finely divided metal of the group consisting of silver, gold and alloys predominating in at least one of these for the production of olefine oxides by the oxidation of olefines with an oxygen-containing gas, which includes the steps of reducing said metal to thin foil of a thickness between about 0.005 mm. to about 0.009 mm., still further reducing said thin foil by mechanical agitation within a body of viscous liquid medium to finely divided fragments capable of passing a screen of 120 mesh, washing said finely divided fragments with water, and subsequently drying them at a low temperature.

9. Process for making catalysts essentially composed of finely divided silver for the production of ethylene oxide by the direct oxidation of ethylene with oxygen-containing gas at temperatures of about 150° to 400° C., which includes the steps of reducing silver to thin foil of a thickness between about 0.005 mm. to about 0.009 mm., and till further reducing said thin foil mechanically to finely divided fragments capable of passing a screen of 120 mesh.

10. The method of producing olefine oxides by catalytic oxidation which comprises subjecting the respective olefine in an oxidizing atmosphere to a temperature ranging from 150° C. to 400° C. in the presence of finely divided silver metal which has been reduced to thin sheets of a thickness between about 0.005 mm. to about 0.009 mm., and still further reduced mechanically to finely divided fragments capable of passing a screen of 120 mesh.

JACQUES FRANÇON.